INVENTOR.
JACK W. HANNAH

United States Patent Office 3,506,269
Patented Apr. 14, 1970

3,506,269
SOUND TRACK SELECTOR
Jack W. Hannah, 1816 Springmill Road,
Mansfield, Ohio 44906
Filed Apr. 11, 1967, Ser. No. 630,067
Int. Cl. G11b 3/78
U.S. Cl. 274—1           10 Claims

ABSTRACT OF THE DISCLOSURE

A device for selectively playing a particular passage of a multipassage element in response to an electrical signal comprising a detector to detect signals from the surface of the element, means to convert the signals to sound, means to provide relative movement between the element and detector, input signal means, motor means, a guide bar having a player arm associated therewith and positioned by the motor means, and means to control the player arm in response to the input signal of the input signal means.

---

The present invention relates to a device for selectively playing a portion of a sound track carried on a multiple-track recording. More specifically, this invention relates to a device adapted to be placed on a phonograph record player for automatically placing the tone arm, which carries the pickup needle, at a desired location in order to play a desired portion of the phonograph record. The device of this invention is adapted to be actuated in its sound track selection by an electrical signal fed thereto which signal may be a means of coordinating optical and audio passages in a teaching machine.

In the field of modern education it has become necessary to devise methods and devices for teaching which are adapted to our modern society. Due to the ever-increasing number of students seeking to be educated and, further, due to the increasing differential between the available educational facilities and teachers and the optimum educational facilities and teachers needed to accommodate this increasing number of students, it has become necessary to devise means for improving the output from the available facilities and teachers to serve more students than was previously possible. Accordingly, various well-known teaching devices have been employed.

One such machine is described in my U.S. Patent No. 3,191,315, wherein reference is made to other previously-tried teaching machines which have not been found suitable for use due to their complex and expensive nature. Such prior machines have used dials and indicators by which a student answers questions which he has dialed by manipulating another dial or indicator and a suitable warning device is used to indicate the correctness of his answer. The defects of such machines include their limited range and capacity as well as the large degree of manipulation required by the student. The teaching machine described in U.S. Patent No. 3,191,315 is self-operated and automatically selects a series of lessons for the student-operator which are correlated with the student's prior response. Such a device serves as a suitable subject for explanation of the operation of the present invention.

My teaching machine, however, only presents lessons to be visually sensed. It does not have an audio presentation to assist the student in understanding the lesson. The sound track selector, which is the subject of this invention, enables the above-mentioned teaching machine to provide audio in accompaniment to its visual presentation. The requirements for such an audio accompaniment are (1) that the sound or message comes on automatically when the visual presentation is being made by the teaching machine, (2) that the message or sound be appropriate for the frame being presented, so that from the perhaps ten or more sound tracks on a record the appropriate message is selected in the same manner as the teaching machine is able to select the one proper frame the student should next view from the large store of frames on the film strip, and (3) that no message or sound be given the student for those frames on the film strip which may not require audio accompaniment.

However, it is to be understood that the present invention is neither limited to use with the teaching machine disclosed in U.S. Patent No. 3,191,315, nor is it to be limited to use with "didactic" machines per se. The device of this invention is, however, adapted to be used with any machine which requires the selective playing of a passage contained on a multiple-passage article.

Prior-art devices for selectively playing portions of a phonograph record are exemplified in U.S. Patents Nos. 2,952,464 and 3,109,655. These devices replace the manual operation that was previously needed to selectively play one of a plurality of discrete sound tracks on a record. U.S. Patent No. 2,952,464 describes an apparatus which utilizes a photoelectric cell carried in a tone arm, which tone arm may be actuated to scan the record. When the tone arm scans the record, it focuses a beam of light upon the record and records the number of sound-track portions passed over; when the desired section number is reached, the tone arm motion is stopped and the tone arm is dropped. Thus, this device enables one to select a portion by number and to indicate the desired portion by manipulating a switch which starts the tone arm moving in its scanning operation and which stops the tone arm at the desired spot. Similarly, U.S. Patent No. 3,109,655 relates to a device for selectively playing a section of a multi-section phonograph record wherein by manual manipulation a tone arm is caused to play only one of a plurality of sound tracks; this device eliminates the direct contact of the hand with the tone arm and thus prevents damage to the tone arm and the record.

The disadvantages of these prior-art devices, as well as of others, are that none are easily adapted to correlation with a picture section and none are of such structure that they may be easily and conveniently used by the student in conjunction with a visual passage.

Further disadvantages of these devices reside in their inherent slowness of operation and the limited range of material which they can accommodate.

In addition, the prior-art devices for selectively playing a portion of a multiple-track record are of expensive and intricate construction, making them prohibitively expensive for many applications, such as in public school systems.

The device of this invention includes a phonograph pickup arm attached to a guide arm in a manner such that the pickup arm can move a given distance which distance corresponds to the radial length of an audio portion of a phonograph record and after traversing such distance the pickup arm power is cut off by contact means carried by the guide arm. The guide arm also carries a plurality of contact members and a set of teeth on one side thereof; these teeth are adapted to be engaged by a gear member having a housing with a contact member depending therefrom. This contact member is adapted to brush against the guide bar contact elements when the gear engages the teeth and thus moves the guide bar relative to the housing until the contact row is found for which the device is seeking. When the contact carried by the housing reaches the contacts on the guide arm corresponding to the input signal then the guide bar is in position to drop the pickup arm onto the record at the audio portion which is to be played. As indicated above, the record plays and the pickup arm is moved in a radial direction, as it reaches the end of the audio portion it touches a contact on the guide arm and the power is cut off until another signal is fed thereto.

The concept of providing correlated audio and visual portions in a didactic machine is not novel in itself. One didactic machine having such correlated parts is represented in U.S. Patent No. 2,950,543. This device provides a reeled section of visual sections which may be selectively played and an aural device for correlating the aural portions with portions from, for example, a phonograph record. However, the apparatus of this patent does not provide a device for selectively playing one of a series of audio tracks on the record by the scanning of a selector device over the player arm in response to a signal fed thereto. This patent thus does not provide a device which is adapted to provide an apparatus for accurately and dependably selecting a section previously selected by reference to the visual teaching aid which is economical to make and easy to operate.

It is therefore a principal object of the instant invention to provide a device whereby a specific message may be selected from a phonograph record platter containing a plurality of messages in accordance with controls operatively associated with a teaching machine.

Another object of this invention is to provide means whereby a specific message may be selected from a record in accordance with any set of signals which serve as a code to determine that a specific message is desired.

A further object of this invention is to provide such a device adapted to respond to the signal sent by a visual portion in a teaching machine.

Another object of this invention is to provide a device of the class described incorporating means to move the tone arm into position to play a given record section accurately and quickly in response to a signal provided thereto.

Other objects and attendant advantages of this invention will be readily appreciated as the same becomes better understood by reference to the following detailed description when considered in connection with the accompanying drawings, wherein.

Like reference numerals indicate like parts throughout the several views of the drawings.

Figure 1:
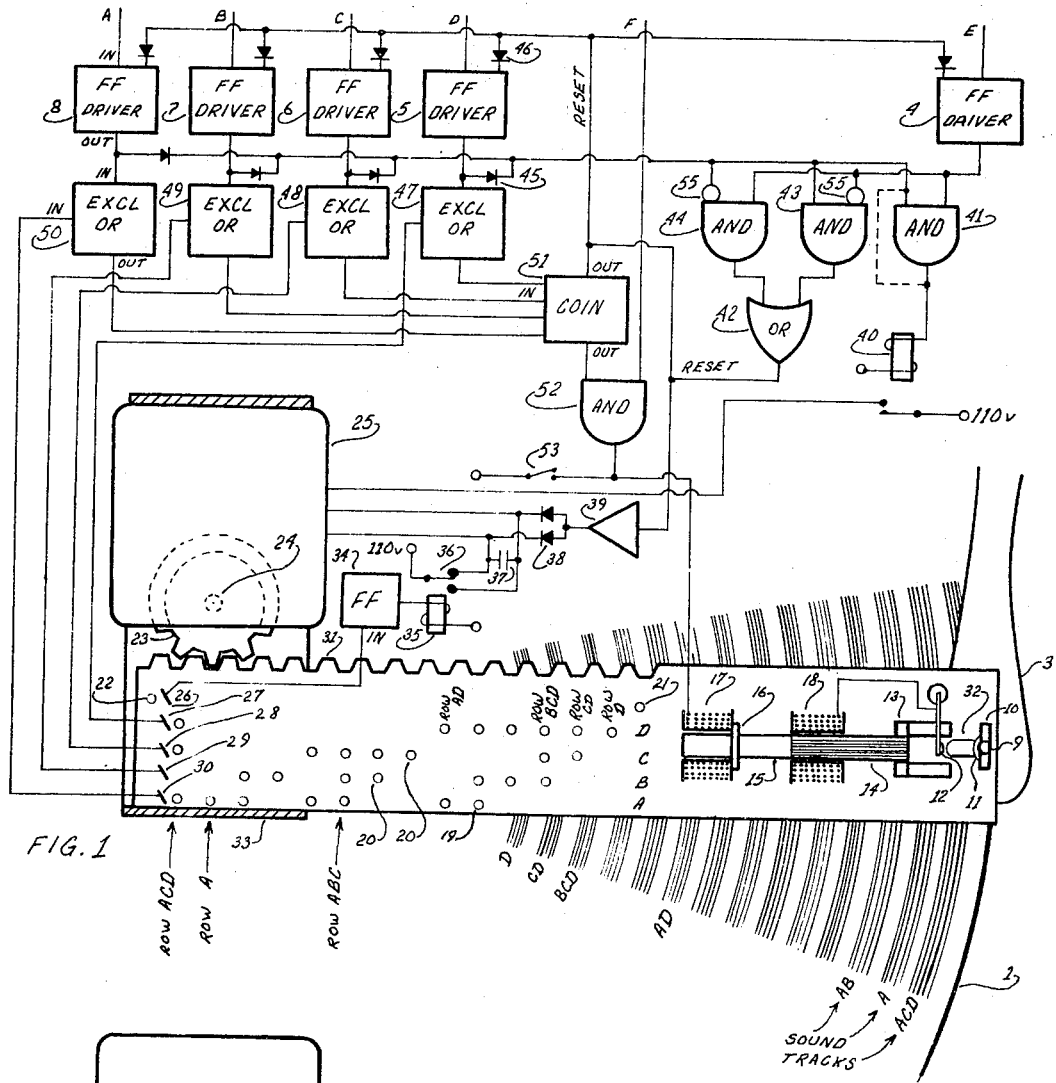
FIG. 1 is a top plan view of the phonograph record as situated on a phonograph, the phonograph pickup arm, the mechanical apparatus for positioning the pickup arm, and a logic diagram type of schematic showing the associated controls.
Figure 2:
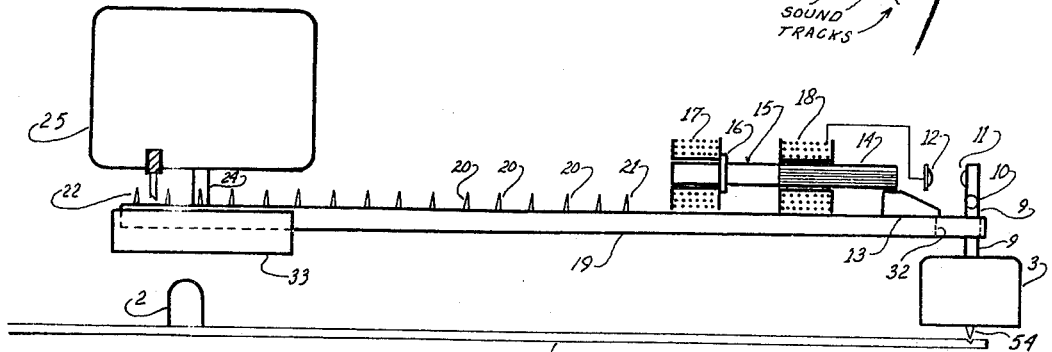
FIG. 2 is a side view of the phonograph record as situated on a phonograph, the phonograph pickup arm, and the mechanical apparatus for positioning the pickup arm.

Referring now to FIG. 1, the phonograph record platter 1, is provided with a series of sound tracks. In accordance with this invention, each track must be the same distance from its neighboring track as the spacing of a row of code contacts 20, is from its neighboring row. In other words, the distance from the row coded A C D to the row coded A on the guide bar 19, is the same as the distance from sound track A C D to sound track A. Likewise, the distance from the row coded A C D to the row coded D on the guide bar 19, is the same as the distance from sound track A C D to sound track D. Thus, the phonograph record must be prepared with short messages capable of being recorded within a distance on a radius of the platter not exceeding the distance from one row of code contacts to a neighboring row. This distance is also the maximum distance attainable between contacts 11 and 12.

The guide bar 19, is capable of moving in a direction parallel to the radius of the phonograph platter when located on a phonograph spindle 2, in position ready to be played. At the end of the guide bar 19, is a slot 32, through which freely moves a post 9, that is anchored onto the player arm 3, of the phonograph. The player arm 3, of the phonograph is thereby restricted in its placement by the position of the guide bar 19; and the player arm is restricted in the extent to which it can move under the guidance of the grooves on a sound track of the platter by the distance between contacts 11 and 12.

The needle 54, of the phonograph's player arm is placed on a sound track in the following manner, for example.

Suppose the teaching machine mentioned hereinabove, or some other device, required the audio portion on sound track A D. In such case, electric signals from the teaching machine would enter the device of this invention on wires labeled A and D to set flip-flop circuits 8 and 5, respectively. These flip-flop circuits (designated F F DRIVERS) may be of any design, although normally transistorized, performing the function of switching on an output and retaining generation of the output even though the input is turned off. The output of such a flip-flop is turned off only by introducing a signal on a separate reset line. Such a flip-flop may also be called a driver circuit or a register because its output gives indication that an input was at some time present and continues to give the indication until reset. Since, according to the example referred to herein, F F Drivers 5 and 8 are turned on, their outputs are directed to exclusive-or circuits (EXCL OR) 47 and 50, respectively. Such exclusive-or circuit may be of several designs, normally transistorized, having two input wires and one output, such that its output signal is generated when simultaneously there is a signal present at both inputs or no signal present at both inputs. In other words, to get an output the two inputs must be in identical state, either signals being present on both or not present on both. Because of this function, such an exclusive-or circuit may be a type of comparator or matching circuit.

The circuit made up of logic elements 41 through 44, will be discussed hereinafter because it is not basic to the overall function of the instant invention, but more particularly relates to some peculiarities of the teaching machine described in U.S. Patent No. 3,191,315. Therefore, ignoring for the moment AND gate 41, the presence of an output signal from any of the F F Driver circuits, 5 through 8, is sufficient to activate relay 40. This turns on the driver motor 25, which, through shaft 24, turns gear 23, engaging the teeth 31 of the guide bar 19. The guide bar is therefore moved in a direction parallel to the radius of the record platter. As the guide bar moves, the metal code contacts 20, mounted thereon, are brushed against the stationary wipe contacts 27, 28, 29 and 30. When any of these wipe contact touches a code contact 20, electric current passes from the metal code contact, through the wipe contact and on to a wire leading to one of the EXCL OR circuits.

In the example mentioned here, EXCL OR circuits 47 and 50 have signals present on their inputs from F F Driver circuits 5 and 8. Therefore, they will generate an output only when their associated wipe contacts 27 and 30, respectively, touch code contacts. The remaining EXCL OR circuits 48 and 49 have no inputs from their associated F F Drivers and, therefore, will generate outputs only when their associated wipe contacts 28 and 29, are not touching code contacts 20.

In accordance with this invention, there is only one location on the guide bar where the wipe contacts would touch code contacts such that each of the EXCL OR circuits would give an output; this is when the guide bar moves into position such that the row of code contacts designated A D are at the wipe contacts. At such position, the guide bar is in a position such that it places the phonograph pickup arm 3, in a position directly over the beginning of the sound track designated as A D. (This particular track would have been previously prepared to contain the message desired when A D signals are generated from the teaching machine.)

Moreover, when the guide bar is moved by the motor to the desired location, indication is given that such is the case by all EXCL OR circuits giving an output. These outputs go to the coincidence (COIN) circuit 51, which gives an output only when input signals are present from all of the EXCL OR circuits. The COIN circuit 51, gives two outputs; one to AND gate 52, and the other to reset the F F Drivers. When the F F Drivers are reset, thereby turning off their output, it produces the effect (ignoring for the moment circuits 41 through 44) of deactivating relay 40 and stopping the motor 25, which stops the guide bar. A signal F comes from the teaching machine to the AND gate 52 which indicates it is ready to receive the message whenever the phonograph is ready. The phonograph is ready, of course, if there is an output from the COIN circuit as explained above. The AND gate 52 is a logic type circuit, usually transistorized, which performs the function of generating an output signal when both its inputs have signals placed on them. Thus, when the guide bar is in a correct location over the sound track and the teaching machine (or other device) is ready, a signal is generated to the solenoid 17. When the solenoid 17, is activated, it draws the plunger 15, until restrained by stopped 16. Preferably, part of the plunger is non-magnetic, as shown at 14, and is connected to a lifter 13. The lifter engages the lug 10, on the post 9, when its position is extended out from solenoids 17 and 18, thereby maintaining the pickup arm 3, of the phonograph in an upward position off the surface of the plater 1. In such position the distance between contacts 11 and 12 is maximum. When, however, the solenoid 17, is activated and the lifter 13, drawn towards the solenoids, the lifter disengages the pickup arm and causes the arm to fall onto the phonograph record. When not driven by the motor, the guide bar remains stationary, retained in a guide system 33, which also supports the motor and stationary wipe contacts. As is quite apparent, the pickup arm will ride in the grooves of the revolving phonograph record, and as it does so, contact 11, on the post of the pickup arm draws closer to stationary contact 12. Contact 11 will touch contact 12 at the termination point of the particular sound track. Upon touching, current is sent to activate solenoid 18. (Solenoid 17, has already become deactivated simply because when the COIN circuit sent out a reset signal it reset all F F Drivers, thereby changing the inputs to the EXCL OR circuits and consequently turning off the output from the COIN circuit, thus turning off the output from the AND gate 52. When solenoid 18, is activated, it pulls the plunger 15 to itself until restrained by the stopper 16. Accordingly, this pushes the lifter 13 into and under the lug 10, of the pickup arm post 9, thus lifting the pickup arm from the phonograph record and returning it in suspension over the start position.

If the listener should wish to replay this sound track, momentary depression of switch 53, supplies an activating signal to solenoid 17, thus repeating the procedure described above.

The guide bar remains over position AD until another set of input signals for a different sound trace is received, whereby the motor is set in motion as described above and the search is made until the code contacts correspond to the new set of input signals. Of course, the next required set of code contacts may be peripherally or centrally located with respect to AD and the motor may drive the guide bar in a direction such that the code contacts are going away from the wipe contacts. In such a case, the guide bar is limited by contacts 21 and 22. Furthermore, whenever the guide bar is moved to such a position that either of these code type contacts (they are similar in appearance to code contacts 20), touches wipe contact 26, a signal is sent to the flip-flop F F 34. Flip-flop 34, is a bistable logic element which changes the state of its output to relay 35, upon receiving a signal impulse. Thus, on one impulse the relay is activated, on the next, deactivated; on the next activated again; etc. Relay 35, controls switch 36, which, when thrown in one direction causes motor 25 to rotate clockwise, but when in the other direction, causes the motor to rotate counterclockwise. Capacitor 37 is merely a normal part of any such conventional A.C. reversible motor. Thus, when the guide bar reaches one extremity, it causes the motor to be reversed and it is then moved in the opposite direction.

Having described the essence of the present invention hereinabove, it is pointed out, however, that there are several circuit additions which enhance its operation or make it more specifically adaptable to the teaching machine described in U.S. Patent No. 3,191,315. First, it is necessary to assure that the guide bar will stop being moved by the gear of the motor almost immediately upon the wipe contacts touching the proper row of code contacts. As previously described, when the proper row is reached the coincidence circuit 51, sends out a reset signal; and, as explained, this reset signal turns off all F F Drivers which affect relay 40 so as to turn off the motor. The reset signal is also used to turn on a switch 39, which places direct current components (through rectifiers 38) onto the leads of the motor. Such a DC component will disrupt the Eddy currents of the AC motor and brake it immediately.

Second, the teaching machine with which this invention is to be used may often take the student to frames not requiring an accompanying audio message. The frames requiring sound will therefore be identified by always having a code which has an E present. In other words, it may be desired to use codes containing A, B, C and D in the teaching machine without activating this sound track selector; consequently, the circuits of 41 through 44 make it necessary to have an incoming code consisting of any combination of A, B, C and D signals plus the E signal. The E signal alone will not activate this invention, nor will A, B, C and D signals activate it without an E signal. In order to accomplish this, leads properly isolated by diodes 45, are taken from the outputs of the F F Drivers associated with A, B, C and D input. This input is taken through a logic inverter 55, to AND gate 44, and also directly to AND gate 43. The other input to AND gate 44, is from F F Driver 4, and this input is sent through an inverter to AND gate 43. The outputs of AND gates 43 and 44 go to OR gate 42. The output of OR gate 42 resets all F F Drivers just as the output from the COIN 51, circuit does. The circuit formed by logic elements 42, 43 and 44 performs the following logical tasks:

| Signal from FF Driver 4 | Signal from any or all of FF Drivers 5, 6, 7, 8 | Output from OR gate 42 |
|---|---|---|
| No | No | No |
| Yes | No | Yes |
| No | Yes | Yes |
| Yes | Yes | No |

Hence, a reset signal will immediately turn off the F F Driver if the E signal and a signal or signals of A, B, C and D are not simultaneously present. The AND gate 41, gives an output when this is the case, and this output signal is used to activate relay 40.

What is claimed is:

1. A device for selectively playing a discrete passage of a multi-passage element in response to an electrical signal which comprises: a multi-passage element, a detector which detects signals from the surface of said element, means for converting said signals to sound, means for providing relative movement between said element and said detector, a plurality of discrete passages carried by said multi-passage element, input signal means, a first circuit means which receives a first input signal from the input signal means, and which switches on an output and retains generation of the said output until reset; second circuit means which second circuit means receives the output from said first circuit means, and which generates an output only where there are simultaneously two signals, or no signals being received; a switching means adapted to be activated when it is desired to start a motor and to be deactivated when said first circuit means is reset; a motor means adapted to be activated upon activation of said switching means, a guide bar having a player arm associated therewith and having a plurality of rows of uniquely coded contact means thereon, said guide bar being adapted to be moved radially of the multi-passage element by said motor means; a plurality of stationary second contacts positioned so as to be activated by the coded contact means on the guide arm when said guide arm is moved; means to carry a signal generated when the coded contact means and second contacts are in a predetermined position to the second circuit means; third circuit means adapted to receive the output from the second circuit means and, upon receipt thereof, to reset the first circuit means; a fourth circuit means adapted to receive a second input signal from the input means indicating that the input means is ready to play a discrete passage, and further being adapted to receive a signal from the third signal means, said fourth circuit means delivering an output only where there are simultaneously two signals present on the input wires; means adapted to be activated by the output from the fourth circuit means to cause the player arm to contact the multi-passage element; means adapted to raise the player arm from said element when the discrete portion thereof has been played.

2. The device of claim 1 wherein said input means is an element of a teaching machine.

3. The device of claim 1 wherein said means to cause the player to contact the multi-passage element comprises first solenoid means, a plunger means having a lifter means attached to one end thereof, said lifter means normally engaging the guide bar player arm but adapted upon activation of the first solenoid means to be disengaged from the player arm as the first solenoid means pulls the plunger to drop said player arm onto the multi-portion element.

4. The device of claim 1 wherein the means adapted to raise the player arm comprises second solenoid means, a first point contact means carried by the player arm and a second point contact means carried by the second solenoid means, a plunger having a lifter engaged by one end thereof in a manner such that, upon activation, the second solenoid means pulls the free end of the plunger until the lifter engages the player arm to thereby lift said player arm from the multi-portion element.

5. The device of claim 1 wherein a replay switch is provided to reactivate said first solenoid means.

6. The device of claim 1 wherein means are provided to reverse the direction of travel of the motor-driven guide bar when the second contact means engages predetermined elements of the first contact means provided on the guide bar.

7. The device of claim 1 wherein the motor means is provided with means which brake the motor immediately.

8. A device for selectively playing a discrete passage of a multi-passage element which comprises: a multi-passage element having a plurality of discrete passages thereon, a detector which detects signals from the surface of said element, means for converting said signals to sound, means for providing relative movement between said element and said detector, input signal means, a motor means, a switch for actuating said motor means, a guide bar having a player arm associated therewith and adapted to be positioned by said motor means, means to control the player arm position in response to the input signal generated by the input signal means.

9. The device of claim 8 wherein the means to control the player arm position comprises contact means and comparator circuit means, said comparator circuit means receiving and retaining an input signal and allowing motor actuation until an identical signal is received from said contact means.

10. The device of claim 8 wherein said means to control the position of the player arm comprises electromagnetic means to move the player arm into and out of contact with the multi-passage element.

References Cited

UNITED STATES PATENTS

| | | | |
|---|---|---|---|
| 2,952,464 | 9/1960 | Stimler | 274—15 |
| 2,953,383 | 9/1960 | Walters | 274—15 |
| 3,109,655 | 11/1963 | Lea | 274—15 X |
| 3,371,933 | 3/1968 | Weitzner | 274—1 |

FOREIGN PATENTS

| | | |
|---|---|---|
| 459,774 | 9/1949 | Canada. |

HARRY N. HAROIAN, Primary Examiner

U.S. Cl. X.R.

35—8; 274—23